US009673720B2

(12) United States Patent
Lin et al.

(10) Patent No.: US 9,673,720 B2
(45) Date of Patent: Jun. 6, 2017

(54) SYNCHRONOUS RECTIFICATION CONTROLLER AND RELATIVE DEAD-TIME CONTROL METHOD

(71) Applicant: Leadtrend Technology Corporation, Hsinchu (TW)

(72) Inventors: Chung-Wei Lin, Hsinchu (TW); Yang-Sheng Lin, Hsinchu (TW)

(73) Assignee: LEADTREND TECHNOLOGY CORPORATION, Hsinchu (TW)

( * ) Notice: Subject to any disclaimer, the term of this patent is extended or adjusted under 35 U.S.C. 154(b) by 39 days.

(21) Appl. No.: 14/604,860

(22) Filed: Jan. 26, 2015

(65) Prior Publication Data

US 2015/0214851 A1 Jul. 30, 2015

(30) Foreign Application Priority Data

Jan. 27, 2014 (TW) ............................ 103102842 A

(51) Int. Cl.
*H02M 3/335* (2006.01)

(52) U.S. Cl.
CPC ..... *H02M 3/33592* (2013.01); *Y02B 70/1475* (2013.01)

(58) Field of Classification Search
CPC ......... H02M 3/33592; H02M 3/33523; H02M 3/3376; Y02B 70/1475; Y02B 70/1433
See application file for complete search history.

(56) References Cited

U.S. PATENT DOCUMENTS

2006/0132113 A1* 6/2006 Cha ..................... H02M 3/1588 323/282
2009/0161396 A1* 6/2009 Lin ................... H02M 3/33592 363/125
2010/0027298 A1* 2/2010 Cohen ............... H02M 3/33592 363/21.14
2010/0302814 A1* 12/2010 Lu ..................... H02M 3/33523 363/21.01
2014/0119063 A1* 5/2014 Tseng ................ H02M 3/33592 363/21.05

* cited by examiner

*Primary Examiner* — Adolf Berhane
*Assistant Examiner* — Henry Lee, III
(74) *Attorney, Agent, or Firm* — McClure, Qualey & Rodack, LLP

(57) ABSTRACT

A synchronous rectification control method suitable for a switching mode power supply with a synchronous rectifier is disclosed. A synchronous rectification controller with a first pin is provided. A pin voltage at the first pin is sampled to generate a sampled voltage. After the sampling, a detection current is provided and it flows out of the synchronous rectification controller from the first pin. Digital dead-time control signals are generated in response to the pin voltage and the sampled voltage. The synchronous rectifier is controlled to determine a dead time of the synchronous rectifier, based upon the digital dead-time control signals.

11 Claims, 5 Drawing Sheets

SYNCHRONOUS RECTIFICATION CONTROLLER AND RELATIVE DEAD-TIME CONTROL METHOD

CROSS-REFERENCE TO RELATED APPLICATION

This application claims priority to and the benefit of Taiwan Application Series Number 103102842 filed on Jan. 27, 2014, which is incorporated by reference in its entirety.

BACKGROUND

The present disclosure relates generally to synchronous rectification, and more particularly to the dead-time control in synchronous rectification.

Power suppliers are demanded for providing accurate output voltages, currents, or powers. Furthermore, to be eco-friendly to this world, power conversion efficiency, the ratio of output power to input power, has become one of the key issues that almost power supplies are required to improve. Several countries have further proposed or enforced regulations regarding power conversion efficiency requirements for certain applications.

FIG. 1 demonstrates a switching mode power supply 10 with a flyback topology. A pulse width modulator 14 turns ON and OFF a power switch 20 alternatively. When the power switch 20 is ON, the input voltage power $V_{IN}$ and input ground 26 together energize the primary winding of the transformer 18. When it is OFF, the energy stored in the transformer 18 is released via the secondary winding of the transformer 18, and rectified by a rectifying diode 12, to build output voltage power $V_{OUT}$ and output ground 28. With appropriate feedback control, the duty cycle of the power switch 20 could be modulated by pulse width modulator 14 so output voltage power $V_{OUT}$ meets its specifications required.

Transformer 18 provides secondary current $I_{SEC}$ from its secondary winding to power output capacitor 17 and load 16, and this secondary current $I_{SEC}$ has go through rectifying diode 12, which has a constant forward voltage (about 1V) and consumes power uselessly and inevitably. To save the power consumed by rectifying diode 12 and improve the power conversion efficiency, rectifying diode 12 has been replaced in some applications by a power switch with a very-low ON resistance, as demonstrated in FIG. 2, and this power switch is called synchronous rectifier 24 in the art. The timing to turn ON or OFF synchronous rectifier 24 must be well controlled to simulate the behavior of rectifying diode 12 in FIG. 1. For example, synchronous rectifier 18 should be turned OFF when power switch 20 is ON and the transformer 18 is being energized, and should be ON when transformer 18 is releasing energy.

Synchronous rectifier 24 need be turned OFF timely before transformer 18 completes discharging to avoid transformer 18 from explosion. In this specification, the duration from the moment of turning OFF synchronous rectifier 24 to the moment when transformer 18 completes discharging is called "dead time $T_{DEAD}$". Dead time $T_{DEAD}$ must be well controlled. If it is too long, the whole power supply system might not gain improvement in conversion efficiency. If it is negative so synchronous rectifier 24 is still ON when power switch 20 is switched ON, transformer 18 might be over energized and could explode, causing risk of fire. The length of dead time $T_{DEAD}$ prefers to depend on system design, and could vary from one power supply system to another even they might have a common topology. Programmability of dead time $T_{DEAD}$ is therefore expected, allowing power supply manufacturers to select the dead time $T_{DEAD}$ they like.

In case that a synchronous rectification (SR) controller that controls synchronous rectifier 24 is embodied by an integrated circuit, the pin count of the SR controller is also important, since it somehow implies cost. Therefore, it is continuously requested to minimize the pin count and to provide programmability of dead time $T_{DEAD}$ at the same time.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Even though the following uses a switching mode power supply with a flyback topology as an example of the embodiments of the invention, this invention is not limited to. For instance, the invention might be embodied by a buck converter, a booster, or a buck-booster.

Figure 1:
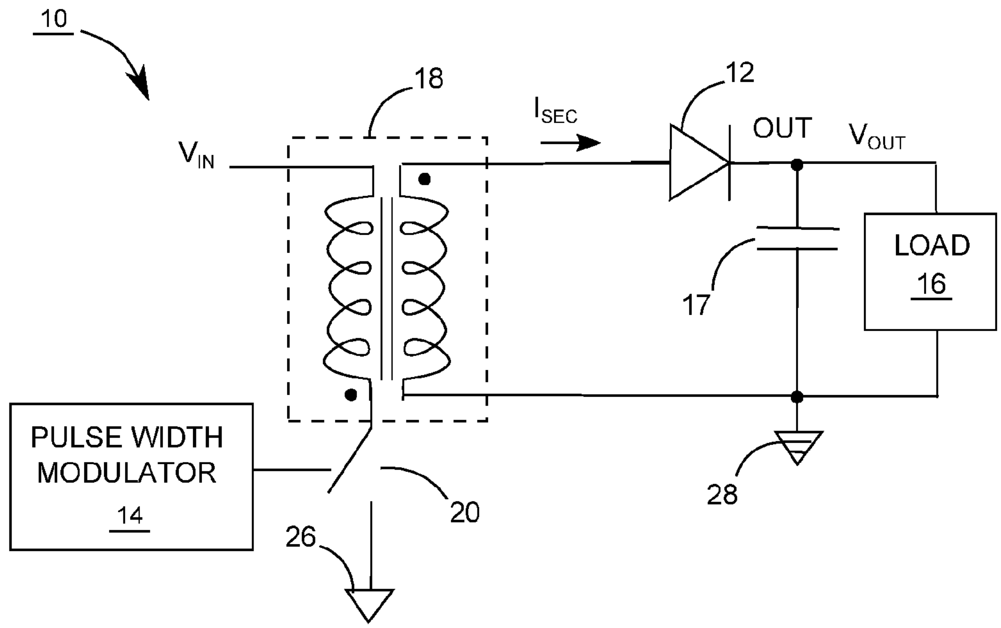
FIG. 1 demonstrates a switching mode power supply with a flyback topology.
Figure 2:
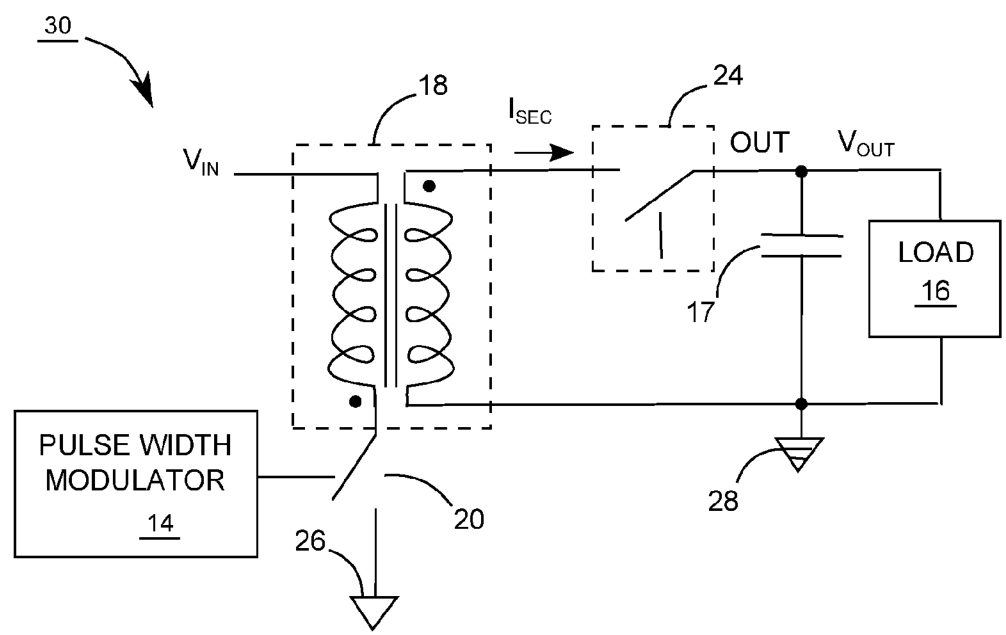
FIG. 2 demonstrates a switching mode power supply with a synchronous rectifier.
Figure 3:
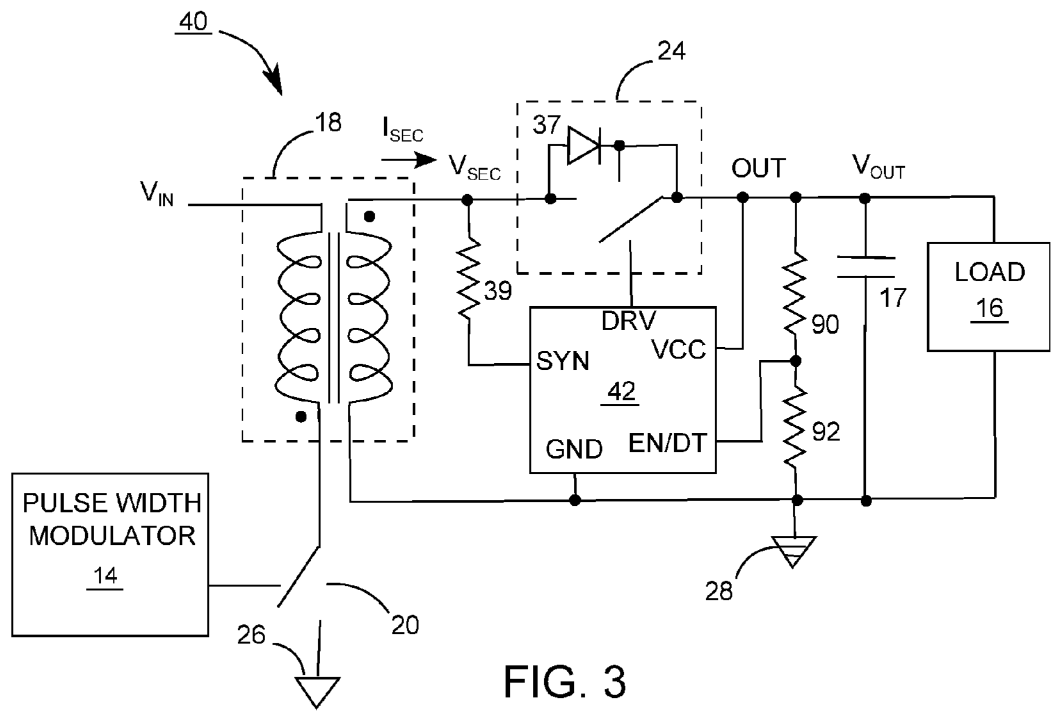
FIG. 3 demonstrates a flyback converter having a SR controller for controlling a synchronous rectifier.

FIG. 3, which is not intended to limit the invention, demonstrates a flyback converter, a switching mode power supply 40, having a SR controller 42 for controlling synchronous rectifier 24, a kind of power switch. In this embodiment, SR controller 42 is in the form of a packaged integrated circuit with pins SYN, DRV, VCC, EN/DT and GND. Exemplified in FIG. 3, synchronous rectifier 24 is a PMOS transistor with a body diode 37 parasitically residing between its source and substrate body. Pin VCC of SR controller 42 is connected to output voltage power source OUT, which is also the source of synchronous rectifier 24, or an output node of synchronous rectifier 24. Pin SYN of SR controller 42 is connected to the drain of synchronous rectifier 24, via resistor 39. Synchronous rectifier 24 has its source shorted to its own substrate body. Pin GND of SR controller 42 is connected to output ground 28. Pins SYN and GND together substantially provide power for SR controller 42 to operate.

Pin EN/DT of SR controller 42 is a multi-functional pin, capable of performing two functions: enabling SR controller 42 and dead-time setting. Resistors 90 and 92 are connected in series between output voltage power source OUT and output ground 28, and have a joint node therebetween connected to pin EN/DT. Proper selection of resistors 90 and 92 could set both the condition for enabling SR controller 42 and the duration of a dead time $T_{DEAD}$ of synchronous rectifier 24.

Figure 4:
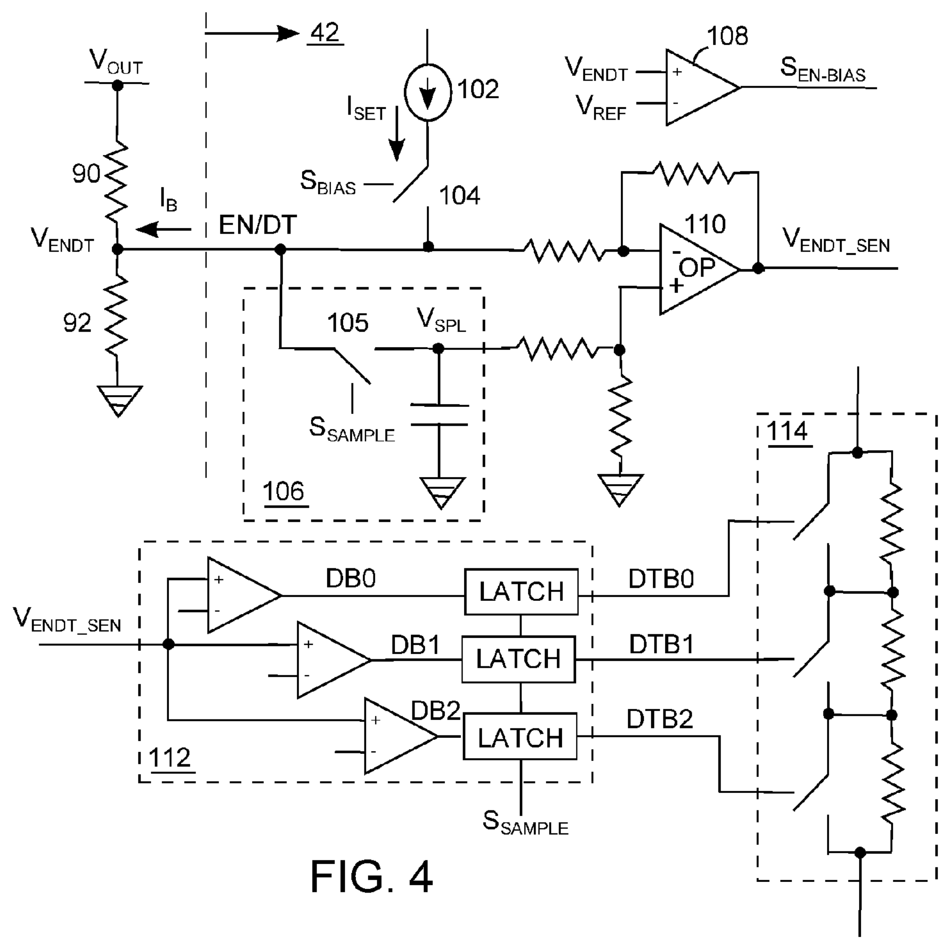
FIG. 4 demonstrates some circuits inside a SR controller in association with external resistors.

FIG. 4 demonstrates some circuits inside SR controller 42 in association with resistors 90 and 92.

Comparator 108 compares pin voltage $V_{ENDT}$ at pin EN/DT with a reference voltage $V_{REF}$ to provide enable signal $S_{EN-BIAS}$. When pin voltage $V_{ENDT}$ exceeds reference voltage $V_{REF}$, enable signal is asserted so SR controller 42 is enabled to start providing bias currents and voltages for proper timing and operation. For example, when enable signal is asserted, SR controller 42 first sets dead time $T_{DEAD}$ and then starts switching synchronous rectifier 24.

Current source 102 provides detection current $I_{SET}$, which, when switch 104 conducts, flows out of SR controller 42 from pin EN/DT to become current $I_B$ and raise pin voltage $V_{ENDT}$.

Sampling circuit 106 provides sampled voltage $V_{SPL}$, which is a sampling result of pin voltage $V_{ENDT}$ when switch 105 is open.

Operational amplifier 110 and the resistors connected to is deemed to be an error amplifier for amplifying the difference between sampled voltage $V_{SPL}$ and pin voltage $V_{ENDT}$ to generate analog gap signal $V_{ENDT\_SEN}$.

Analog-to-digital converter 112 converts analog gap signal $V_{ENDT\_SEN}$ into several digital signals DB0, DB1 and DB2. Several latches could latch digital signal DB0, DB1, and DB2, and provides digital dead-time control signals DTB0, DTB1, and DTB2. In one embodiment, when digital signal DB0, DB1, and DB2 have been latched to provide digital dead-time control signals DTB0, DTB1, and DTB2, detection current $I_{SET}$ is stopped. After the period of time for setting dead time $T_{DEAD}$, digital dead-time control signals DTB0, DTB1, and DTB2 are kept as unchanged.

The resistance of variable resistor 114 is determined by digital dead-time control signals DTB0, DTB1 and DTB2, as demonstrated by FIG. 4.

Figure 5:
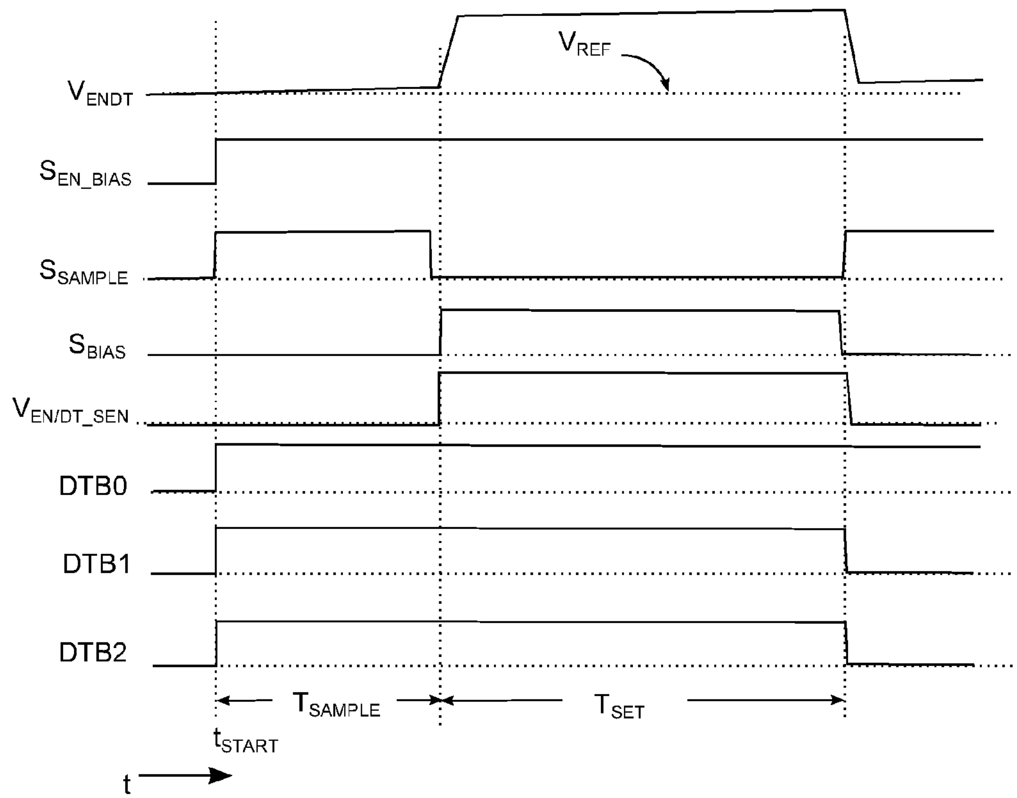
FIG. 5 shows waveforms for signals in FIG. 4.

FIG. 5 shows waveforms for signals in FIG. 4.

Following the rising of output voltage power $V_{OUT}$, pin voltage VENDT exceeds reference voltage $V_{REF}$ at moment $t_{START}$, so enable signal $S_{EN-BIAS}$ is asserted to enable SR controller 42, which defines sampling period $T_{SAMPLE}$ first and setting period $T_{SET}$ second.

During sampling period $T_{SAMPLE}$, signal $S_{SAMPLE}$ is asserted and signal $S_{BIAS}$ is deasserted, so detection current $I_{SET}$ is stopped from flowing to pin EN/DT. Meanwhile, pin voltage $V_{ENDT}$ is about in proportion to the voltage of output voltage power $V_{OUT}$, and sampled voltage $V_{SPL}$, as switch 105 conducts, substantially equals to pin voltage $V_{ENDT}$. Accordingly, analog gap signal $V_{ENDT\_SEN}$ is about 0V. For example, pin voltage $V_{ENDT}$ is about $V_{OUT}*R_{92}/(R_{92}+R_{90})$, where $R_{92}$ and $R_{90}$ are resistances of resistor 92 and 90 respectively.

During setting period $T_{SET}$ (of FIG. 5), signal $S_{SAMPLE}$ is deasserted and signal $S_{BIAS}$ is asserted, so detection current $I_{SET}$ now flows out of SR controller 42 from pin EN/DT, and pin voltage $V_{ENDT}$ becomes about $V_{OUT}*R_{92}/(R_{92}+R_{90})+I_{SET}*(R_{92}||R_{90})$, where $R_{92}||R_{90}$ denotes the effective resistance when resistors 92 and 90 are connected in parallel. Since signal $S_{SAMPLE}$ is deasserted, switch 105 is open, and sampled voltage $V_{SPL}$ is held by a capacitor to be $V_{OUT}*R_{92}/(R_{92}+R_{90})$ as it was. Analog gap signal $V_{ENDT\_SEN}$ is about $I_{SET}*(R_{92}||R_{90})*K$, where K is the voltage gain of the error amplifier composed of operational amplifier 110 and associative resistors. In the meantime, digital signals DB0, DB1 and DB2 are the conversion results of analog gap signal $V_{ENDT\_SEN}$, but digital dead-time control signals DTB0, DTB1, DTB2, isolated by latches, remains as they were during sampling period $T_{SAMPLE}$.

At the end of setting period $T_{SET}$, signal $S_{SAMPLE}$ is asserted and signal $S_{BIAS}$ is desserted. So detection current $I_{SET}$ stops flowing to pin EN/DT, and pin voltage $V_{ENDT}$ is about in proportion to the voltage of output voltage power $V_{OUT}$, while sampled voltage $V_{SPL}$ is about the same as pin voltage VENDT. The rising edge of signal $S_{SAMPLE}$ makes latches latch digital signals DB0, DB1, and DB2 to generate digital dead-time control signals DTB0, DTB1 and DTB2. In one embodiment, after setting period $T_{SET}$, detection current $I_{SET}$ stops, becoming about 0 A, beneficial in power saving. As demonstrated by FIG. 4, digital dead-time control signals DTB0, DTB1 and DTB2 determines the resistance of variable resistor 114. After setting period $T_{SET}$, if the voltage of output voltage power $V_{OUT}$ goes below the reference voltage $V_{REF}$, comparator 108 could signal to disable SR controller 42.

After setting period $T_{SET}$ (of FIG. 5), SR controller 42 starts switching ON and OFF synchronous rectifier 24, based on variable resistor 114. Variable resistor 114 determines the ON time of synchronous rectifier 24, and, from one perspective, determines dead time $T_{DEAD}$ of synchronous rectifier 24. Dead time $T_{DEAD}$ is accordingly in association with $I_{SET}*(R_{92}||R_{90})*K$. As $I_{SET}$ and K are predetermined when SR controller 42 is manufactured, system designers could select the resistances of resistors 90 and 92 to properly set dead time $T_{DEAD}$.

According to the aforementioned teaching, pin EN/DT is a multi-functional pin. Selection of resistors 90 and 92 could determine both the condition when SR controller 42 is enabled, and the expected value of dead time $T_{DEAD}$.

Figure 6:
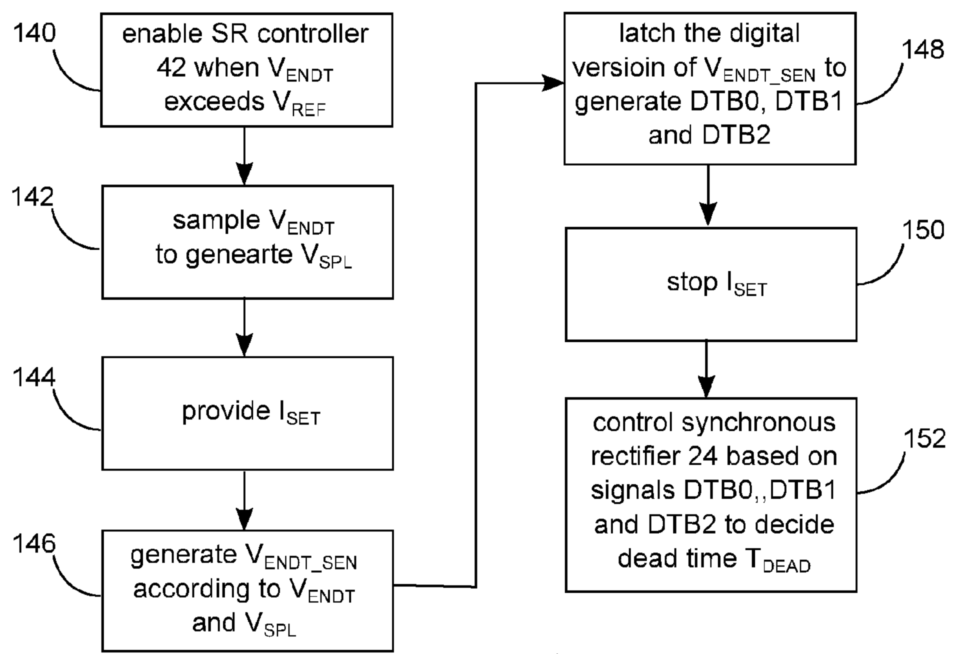
FIG. 6 shows a control method according to embodiments of the invention.

FIG. 6 shows a control method according to embodiments of the invention, following explanation of which is referred to both FIGS. 4 and 5.

Step 140 determines pin voltage $V_{ENDT}$ exceeds reference voltage $V_{REF}$, so enables SR controller 42, which starts providing bias conditions and timings for proper operation.

Step 142 samples pin voltage $V_{ENDT}$ to generate sampled voltage $V_{SPL}$.

Step 144 provides detection current $I_{SET}$ flowing out of SR controller 42 from pin EN/DT. Pin voltage $V_{ENDT}$ is increased, becoming different from sampled voltage $V_{SPL}$.

Step 146 generates analog gap signal $V_{ENDT\_SEN}$ according to the difference between pin voltage $V_{ENDT}$ and sampled voltage $V_{SPL}$. The digital conversion results of analog gap signal $V_{ENDT\_SEN}$ are latched in step 148 to generate digital dead-time control signals DTB0, DTB1 and DTB2.

Step 150 stops detection current $I_{SET}$ from flowing out of SR controller 42.

Step 152 determines the resistance of variable resistor 114 according to digital dead-time control signals DTB0, DTB1 and DTB2, thereby substantially determining both the ON time and the dead time $T_{DEAD}$ of synchronous rectifier 24.

Figure 7:
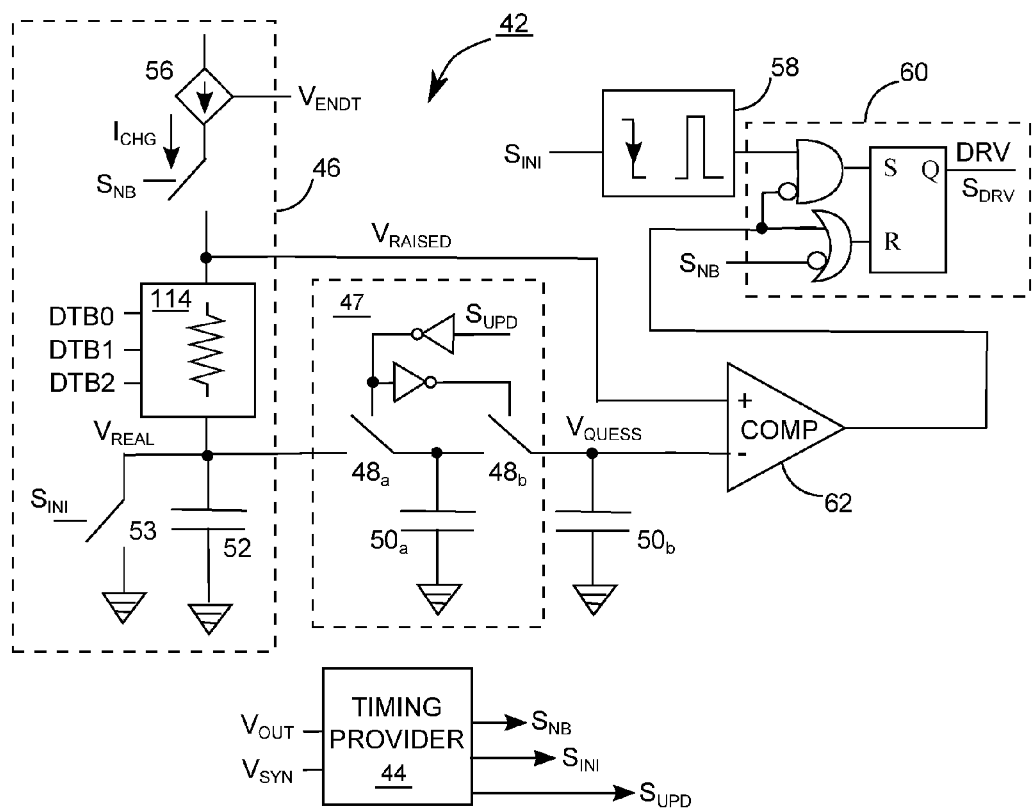
FIG. 7 demonstrates some circuits in a SR controller regarding to the ON time control of a synchronous rectifier.

FIG. 7 demonstrates some circuits in SR controller 42 regarding to the ON time control of synchronous rectifier 24, as an example to explain how dead time $T_{DEAD}$ is affected by variable resistor 114.

Timing provider 44 generates and provides bias-condition signal $S_{NB}$, initiation signal $S_{INI}$, and update signal $S_{UPD}$, in response to the output voltage power $V_{OUT}$ at pin VCC and the voltage $V_{SYN}$ at pin SYN. Discharge-time recorder 46 provides present duration signal $V_{REAL}$, which represents or corresponds to the duration when body diode 37 is forward biased or when secondary current $I_{SEC}$ is positive to charge output capacitor 17. Record capacitor 50$_b$ provides an estimated duration signal $V_{QUESS}$. Update circuit 47 uses the peak of present duration signal $V_{REAL}$ to update estimated duration signal $V_{QUESS}$ at a predetermined moment after discharge time $T_{DIS}$, which will be detailed later, such that estimated duration signal $V_{QUESS}$ becomes, switching cycle by switching cycle, closer to the peak of present duration signal $V_{REAL}$. Comparator 62 and logic circuit 60 as a whole is deemed to be a switch controller, for generating a gate signal $S_{DRV}$ at pin DRV to control synchronous rectifier 24.

Estimated duration signal $V_{QUESS}$ represents an estimated result of a discharge time $T_{DIS}$ in the current switching cycle. In one embodiment, estimated duration signal $V_{QUESS}$ is used to determine the moment when synchronous rectifier 24 is switched to be OFF, and, no matter what its initial value is, it quickly approaches to the peak of present duration signal $V_{REAL}$, or the representative of discharge time $T_{DIS}$, switching cycle by switching cycle.

Figure 8:
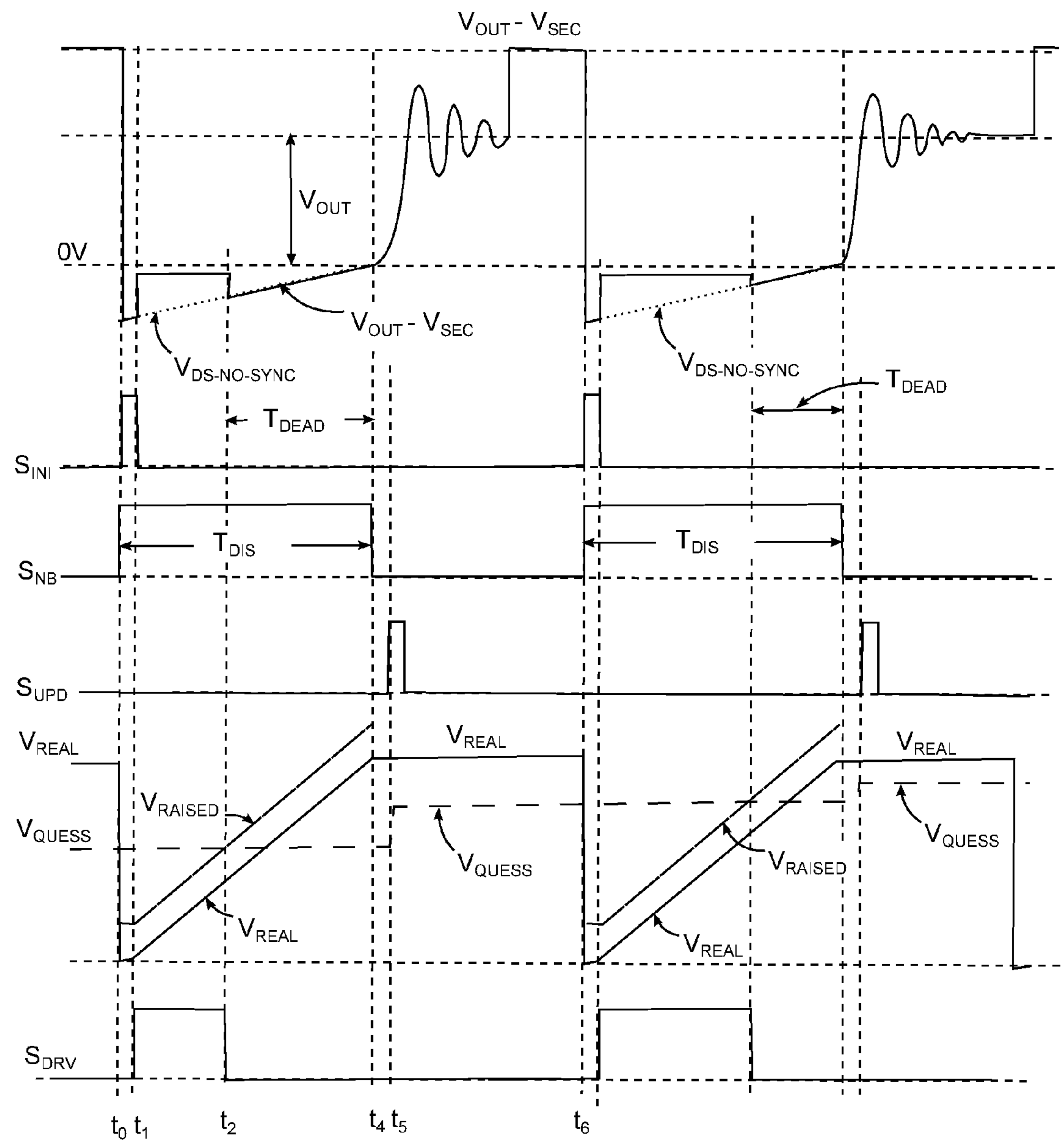
FIG. 8 shows a timing diagram for signals in FIG. 7.

FIG. 8 shows a timing diagram for signals in FIG. 7, to detail possible operations of the circuits in FIG. 7 in reference to switching mode power supply 40 in FIG. 3.

The upmost waveform in FIG. 8 represents the voltage difference between output voltage power $V_{OUT}$ and the voltage $V_{SEC}$ at one end of the secondary winding of transformer 18. At moment $t_0$, as power switch 20 in FIG. 3 is just turned OFF, voltage $V_{SEC}$ becomes larger than output voltage power $V_{OUT}$, and timing provider 44 accordingly generates a short pulse to be initiation signal $S_{INI}$, meaning the beginning of a discharge time $T_{DIS}$. Bias-condition signal $S_{NB}$ is "1" in logic if voltage $V_{SEC}$ exceeds output voltage power $V_{OUT}$ when body diode 37 is forward biased; and it is "0" if output voltage power $V_{OUT}$ exceeds voltage $V_{SEC}$ when body diode 37 is reversely biased. One duration when bias-condition signal $S_{NB}$ is kept as "1" is a discharge time $T_{DIS}$ as being denoted in FIG. 8. At moment $t_4$ in FIG. 8, body diode 37 becomes reversely biased, so bias-condition signal $S_{NB}$ turns to be "0", concluding discharge time $T_{DIS}$. At moment $t_5$ soon after moment $t_4$ in FIG. 5, timing provider 44 generates another short pulse as update signal $S_{UPD}$.

At moment $t_0$, the pulse of initiation signal $S_{INI}$ turns ON switch 53, resetting present duration signal $V_{REAL}$ to be 0V. Present duration signal $V_{REAL}$ is kept as 0V until moment $t_1$, and the duration between moments $t_0$ and $t_1$, the pulse width of initiation signal $S_{INI}$, is called initial time.

At moment $t_1$, charge current $I_{CHG}$, generated by voltage-to-current converter 56 according to pin voltage $V_{ENDT}$, starts charging capacitors 52 and 50$_a$ via variable resistor 114, to provide present duration signal $V_{REAL}$, which ramps up over time until the end of discharge time $T_{DIS}$. Accordingly, present duration signal $V_{REAL}$ is also a ramp signal, and discharge-time recorder 46 is also a ramp generator. After moment $t_4$ when discharge time $T_{DIS}$ concludes, present duration signal $V_{REAL}$ is held unchanged, remaining at its peak, whose voltage value represents discharge time $T_{DIS}$ or, in other words, the duration when body diode 37 is forward biased.

As denoted in FIG. 7, voltage $V_{RAISED}$ and present duration signal $V_{REAL}$ are the voltages at two opposite ends of variable resistor 114. When bias-condition signal $S_{NB}$ is "1" in logic, charge current $I_{CHG}$ from voltage-to-current converter 56 flows first to the node with voltage $V_{RAISED}$ and second to the node with present duration signal $V_{REAL}$, so voltage $V_{RAISED}$ is higher than present duration signal $V_{REAL}$, as shown in FIG. 8. Variable resistor 114 could be deemed as an offset generator providing an offset voltage to present duration signal $V_{REAL}$ for generating voltage $V_{RAISED}$. This offset voltage therefore depends on digital dead-time control signals DTB0, DTB1 and DTB2.

At moment $t_1$ when the short pulse of initiation signal $S_{INI}$ ends, the falling edge of initiation signal $S_{INI}$ sets the SR register in logic circuit 60, making gate signal $S_{DRV}$ at the output of the SR register "1" in logic, as shown in FIG. 8. In this embodiment, since synchronous rectifier 24 is a PMOS transistor, gate signal $S_{DRV}$ is at a relatively-low voltage level to turn ON synchronous rectifier 24 if its logic value is "1". In the opposite, it is at a relatively-high voltage level to turn OFF synchronous rectifier 24 if its logic value is "0". Due to the very low ON-resistance of synchronous rectifier 24, the turning ON of synchronous rectifier 24 suddenly reduces the voltage difference between output voltage power $V_{OUT}$ and the voltage $V_{SEC}$. FIG. 8 also illustrates reference signal $V_{DS\text{-}NO\text{-}SYNC}$, which is used as a comparison, has a waveform with dotted curves in FIG. 8, and illustrates what the voltage difference would like if synchronous rectifier 24 were replaced by a rectifying diode.

At moment $t_2$ when voltage $V_{RAISED}$ exceeds estimated duration signal $V_{QUESS}$, the output of comparator 62 of FIG. 7 resets the SR register in logic circuit 60, making gate signal $S_{DRV}$ "0" and turning OFF synchronous rectifier 24. Accordingly, in the meantime, the voltage difference between output voltage power $V_{OUT}$ and the voltage $V_{SEC}$ merges with reference signal $V_{DS\text{-}NO\text{-}SYNC}$, as shown in FIG. 8. Simply put, at the moment when present duration signal $V_{REAL}$ ramps cross, or higher than, estimated duration signal $V_{QUESS}$ minus the offset voltage provided by variable resistor 114, synchronous rectifier 24 is switched to be OFF.

The period of time from moment $t_2$ to moment $t_4$ is denoted as dead time $T_{DEAD}$, as shown in FIG. 8.

At moment $t_5$, the pulse of update signal $S_{UPD}$ first turns OFF switch 48$_a$ and then turns ON switch 48$_b$. When switch 48$_a$ is just turned OFF, capacitor 50$_a$ records present duration signal $V_{REAL}$, which in the meantime is at its peak. At the moment when switch 48$_b$ is turned ON, charge sharing between two capacitors 50$_a$ and 50$_b$ occurs as they are sharing a common node, so estimated duration signal $V_{QUESS}$ is altered or updated. For example, if capacitors 50$_a$ and 50$_b$ have about the same capacitance. The voltage level of the new estimated duration signal $V_{QUESS}$ after updated will be just at the middle between the voltage levels of present duration signal $V_{REAL}$ and the old estimated duration signal $V_{QUESS}$, as demonstrated in FIG. 8. Based on the theory of charge sharing, $V_{QUESS}$ after updated must be equal to $w*V_{QUESS}+(1-w)*V_{REAL}$, where w is a weighting factor between 0 and 1 and depends on the capacitances of capacitors 50$_a$ and 50$_b$.

At moment $t_6$ in FIG. 8, power switch 20 (in FIG. 3) is switched to be OFF again, so the pulse of initiation signal $S_{INI}$ reappears and bias-condition signal $S_{NB}$ turns to be "1". The duration from moment $t_0$ and $t_6$ could be deemed as a switching cycle. During the switching cycle following moment $t_6$, estimated duration signal $V_{QUESS}$ is updated again, and becomes further closer to the peak value of present duration signal $V_{REAL}$, as shown in FIG. 8.

The pulse width of gate signal $S_{DRV}$ shown in FIG. 8 for the switching cycle from moment $t_0$ to moment $t_6$ safely resides within discharge time $T_{DIS}$, even it is much narrower than the width of discharge time $T_{DIS}$ in the same switching cycle. The pulse width of gate signal $S_{DRV}$ after moment $t_6$ significantly increases, so as to increase the conversion efficiency of switching mode power supply 40 in FIG. 3.

This increment in the pulse width of gate signal $S_{DRV}$ stops when estimated duration signal becomes equal to the peak of present duration signal $V_{REAL}$.

Based on the aforementioned teaching, estimated duration signal $V_{QUESS}$ approaches, switching cycle by switching cycle, the peak value of present duration signal $V_{REAL}$, and this result is achieved by charge sharing between two capacitors. Charge sharing could make estimated duration signal $V_{QUESS}$ approach the peak value of present duration signal $V_{REAL}$ at a pretty high rate. The offset voltage provided by variable resistor 114 helps with generating gate signal $S_{DRV}$ to turn OFF synchronous rectifier 24 timely before body diode 37 becomes positively biased, so the power conversion efficiency could be improved. The use of variable resistor 114 could result in a circuit more immune to variation of manufacture processes, circuit operation temperature, and so on. The resistance of variable resistor 114 could is programmable by selecting resistors 90 and 92.

In a steady state when load 16 (of FIG. 3) has not changed for a very long time, dead time $T_{DEAD}$ is determined by the resistance of variable resistor 114.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A synchronous rectification control method, suitable for a switching mode power supply with a synchronous rectifier, comprising:

providing a synchronous rectification controller with a first pin;

sampling a pin voltage at the first pin to generate a sampled voltage;

after the sampling, providing a detection current flowing out of the synchronous rectification controller from the first pin;

generating digital dead-time control signals in response to a difference between the pin voltage and the sampled voltage;

controlling the synchronous rectifier based upon the digital dead-time control signals to determine a dead time of the synchronous rectifier;

comparing the sampled voltage with the pin voltage to generate an analog gap signal;

converting the analog gap signal into digital signals; and latching the digital signals to provide the digital dead-time control signals.

2. The synchronous rectification control method of claim 1, wherein the first pin is a multi-functional pin, and the synchronous rectification control method further comprises:

before providing the detection current, enabling the synchronous rectification controller when the pin voltage exceeds a predetermined reference voltage.

3. The synchronous rectification control method of claim 1, comprising:

controlling a variable resistor in response to the digital dead-time control signals;

wherein the digital dead-time control signals determines a resistance of the variable resistor.

4. The synchronous rectification control method of claim 3, comprising:

providing a charge current charging a capacitor through the variable resistor, to generate a ramp signal and a raised signal at two ends of the variable resistor respectively;

when the synchronous rectifier is turned OFF, updating an estimated duration signal based on the ramp signal; and determining an ON time of the synchronous rectifier in response to the estimated duration signal and the raised signal, so as to decide the dead time.

5. A synchronous rectification control method, suitable for a switching mode power supply with a synchronous rectifier, comprising:

providing a synchronous rectification controller with a first pin;

sampling a pin voltage at the first pin to generate a sampled voltage;

after the sampling, providing a detection current flowing out of the synchronous rectification controller from the first pin;

generating digital dead-time control signals in response to the pin voltage and the sampled voltage; and controlling the synchronous rectifier based upon the digital dead-time control signals to determine a dead time of the synchronous rectifier, wherein when the detection current is absent the pin voltage is about in proportion to an output voltage of the switching mode power supply, and the output voltage is at a rectified output of the synchronous rectifier.

6. The synchronous rectification control method of claim 1, wherein after the digital dead-time control signals are generated the detection current is stopped.

7. A synchronous rectification controller for controlling a synchronous rectifier, comprising:

a first pin;

a current source for selectively providing a detection current output of the synchronous rectification controller from the first pin;

a sampling circuit, coupled to the first pin, for sampling a pin voltage at the first pin to generate a sampled voltage;

an error amplifier configured to generate an analog gap signal based on the sampled voltage and the pin voltage when the detection current is provided; and an analog-to-digital converter, for converting the analog gap signal into digital dead-time control signals;

wherein the digital dead-time control signals determines a dead time of the synchronous rectifier.

8. The synchronous rectification controller of claim 7, wherein the analog-to-digital converter converting the analog gap signal into digital signals that are latched to generate the digital dead-time control signals.

9. The synchronous rectification controller of claim 7, further comprising:

a variable resistor controlled by the digital dead-time control signals.

10. The synchronous rectification controller of claim 9, comprising:

an ON-time controller, comprising the variable resistor, and configured to generate a ramp signal and a raised signal, wherein the variable resistor is capable of determining a difference between the ramp signal and the raised signal.

11. The synchronous rectification controller of claim 10, wherein the ON-time controller comprises a second current source and a capacitor, the variable resistor is connected between the second current source and the capacitor, and the ramp signal and the raised signal are generated at two ends of the variable resistor respectively.

* * * * *